(12) United States Patent
Otto et al.

(10) Patent No.: US 11,341,948 B2
(45) Date of Patent: May 24, 2022

(54) ELECTROMAGNETIC ACTUATOR WITH IMPROVED SPRING ARRANGEMENT

(71) Applicant: Sound Solutions International Co., Ltd., Beijing (CN)

(72) Inventors: Gustav Otto, Vienna (AT); Christoph Schmauder, Vienna (AT); Michael Schoffmann, Baden (AT); Franz Heidinger, Unterwaltersdorf (AT)

(73) Assignee: Sound Solutions International Co., Ltd., Beijing (CN)

( * ) Notice: Subject to any disclaimer, the term of this patent is extended or adjusted under 35 U.S.C. 154(b) by 0 days.

(21) Appl. No.: 16/931,372

(22) Filed: Jul. 16, 2020

(65) Prior Publication Data

US 2021/0021933 A1 Jan. 21, 2021

(30) Foreign Application Priority Data

Jul. 17, 2019 (AT) .............................. A 50643/2019
Jan. 10, 2020 (AT) .............................. A 50013/2020
(Continued)

(51) Int. Cl.
*G10K 9/13* (2006.01)
*G06F 1/16* (2006.01)
(Continued)

(52) U.S. Cl.
CPC .............. *G10K 9/13* (2013.01); *F16F 1/021* (2013.01); *F16F 1/326* (2013.01); *G06F 1/1605* (2013.01);
(Continued)

(58) Field of Classification Search
CPC . H04R 9/00; H04R 9/02; H04R 9/025; H04R 9/04; H04R 9/041; H04R 9/043;
(Continued)

(56) References Cited

U.S. PATENT DOCUMENTS 6,377,145 B1   4/2002   Kumagai
7,550,880 B1   6/2009   Pusl
(Continued)

FOREIGN PATENT DOCUMENTS

CN   1294832 A   9/2001
CN   1347628 A   1/2002
(Continued)

OTHER PUBLICATIONS

Austrian Patent Office; First Office Action issued in counterpart application No. A 50441/2020, dated Feb. 17, 2021.
(Continued)

*Primary Examiner* — Walter F Briney, III
(74) *Attorney, Agent, or Firm* — Dykema Gossett PLLC

(57) ABSTRACT

The invention relates to an electromagnetic actuator, which can be connected to a backside of a plate like structure and which comprises a voice coil, a magnet system and a spring arrangement connecting the voice coil and a movable part of the magnet system. The spring arrangement comprises at least two spiral springs each having at least three spring legs. The spring legs run in radial and tangential direction in a clockwise or counterclockwise winding direction and are rotational symmetric around the coil axis. The winding directions of the spiral springs are chosen in a way that rotations around the coil axis caused by a relative movement between the voice coil and the movable part of the magnet system in the excursion direction are oriented in opposite directions. The invention also relates to an output device with a plate like structure and an electromagnetic actuator connected thereto.

26 Claims, 4 Drawing Sheets

(30) Foreign Application Priority Data

May 20, 2020 (AT) .............................. A 50441/2020
May 20, 2020 (AT) .............................. A 50442/2020

(51) Int. Cl.
| | | |
|---|---|---|
| G06F 3/16 | (2006.01) | |
| F16F 1/02 | (2006.01) | |
| F16F 1/32 | (2006.01) | |
| H02K 41/035 | (2006.01) | |
| H04R 1/02 | (2006.01) | |
| H04R 9/02 | (2006.01) | |
| H04R 9/04 | (2006.01) | |
| H04R 9/06 | (2006.01) | |

(52) U.S. Cl.
CPC ........... *G06F 3/16* (2013.01); *H02K 41/0354* (2013.01); *H04R 1/028* (2013.01); *H04R 9/025* (2013.01); *H04R 9/045* (2013.01); *H04R 9/046* (2013.01); *H04R 9/066* (2013.01); *H04R 2499/15* (2013.01)

(58) Field of Classification Search
CPC .......... H04R 9/045; H04R 9/06; H04R 9/066; H04R 11/00; H04R 11/02; H04R 2209/00; H04R 2209/027; H04R 2307/00; H04R 2307/201; H04R 2400/03; H04R 2460/13; H04R 2499/15; H02K 41/0354; G06F 1/1605; G10K 9/13
See application file for complete search history.

(56) References Cited

U.S. PATENT DOCUMENTS

| | | | |
|---|---|---|---|
| 2003/0036364 A1* | 2/2003 | Chung ................ | H04R 1/00 455/575.1 |
| 2003/0124990 A1* | 7/2003 | Kawano ................ | B06B 1/045 455/90.1 |
| 2003/0227225 A1* | 12/2003 | Kaneda ................ | H02K 33/16 310/81 |
| 2004/0001603 A1 | 1/2004 | Sahyoun | |
| 2007/0164616 A1 | 7/2007 | Kuwabara et al. | |
| 2007/0291976 A1 | 12/2007 | Kajiwara | |
| 2009/0174510 A1* | 7/2009 | Kim .................... | H02K 33/16 335/222 |
| 2010/0189304 A1 | 7/2010 | Ueda | |
| 2014/0103751 A1 | 4/2014 | Furukawa et al. | |
| 2014/0241564 A1* | 8/2014 | Kang .................. | H04B 1/3888 381/386 |
| 2014/0254191 A1* | 9/2014 | Yasuike ................ | H04R 1/028 362/549 |
| 2017/0280216 A1 | 9/2017 | Lee et al. | |
| 2018/0279052 A1 | 9/2018 | Reining | |
| 2019/0092231 A1* | 3/2019 | Lee ...................... | H04R 9/02 |
| 2019/0215603 A1 | 7/2019 | Timothy et al. | |
| 2020/0045466 A1 | 2/2020 | Song et al. | |
| 2020/0107132 A1* | 4/2020 | Concessi ............. | H04R 9/025 |
| 2021/0099063 A1 | 4/2021 | Wasenczuk | |

FOREIGN PATENT DOCUMENTS

| | | |
|---|---|---|
| CN | 101007305 A | 8/2007 |
| CN | 101983514 A | 2/2011 |
| CN | 103731003 A | 4/2014 |
| CN | 107750040 A | 3/2018 |
| CN | 108668198 A | 10/2018 |
| CN | 207968942 U | 10/2018 |
| EP | 1310860 A1 | 5/2003 |
| EP | 3226069 A2 | 10/2017 |
| EP | 3229063 A1 | 10/2017 |
| EP | 3229272 A1 | 10/2017 |
| JP | 2003211087 A | 7/2003 |
| WO | 0047013 A1 | 8/2000 |
| WO | 0067523 A2 | 11/2000 |
| WO | 03067923 A2 | 8/2003 |
| WO | 2009133986 A1 | 11/2009 |
| WO | 2011104659 A2 | 9/2011 |
| WO | 2012032124 A1 | 3/2012 |
| WO | 2012129247 A2 | 9/2012 |
| WO | 2014073448 A1 | 5/2014 |

OTHER PUBLICATIONS

Austrian Patent Office; First Office Action issued in counterpart application No. A 50442/2020, dated Feb. 17, 2021.
First Office Action for counterpart Austrian patent application No. A50643/2019 dated Nov. 6, 2019.
Austrian Patent Office; First Office Action issued in priority application No. A 50013/2020, dated Sep. 29, 2020.
State Intellectual Property Office PRC. First Office Action and Search Report issued for counterpart Chinese application No. 202010702368.8, dated Jun. 25, 2021.
State Intellectual Property Office PRC. First Office Action and Search Report issued for counterpart Chinese application No. 202010702391.7, dated Jun. 28, 2021.
Hu Xiao-Fei et al. Development and Application Prospects of the Electromagnetic Brake. vol. 47, No. 4. Beijing Research Institute of Precise Mechanical and Electronic Control Equipment.
Zhou Wen-Jie et al. Performance Analysis of Three Type Flexure Bearings for Linear Compressors. vol. 43, No. 1. Journal of Nanjing University of Aeronautics & Astronautics.
Office Action and Search Report for counterpart application CN 202010702391 7, with English machine translation dated Jan. 13, 2022.
Office Action and Search Report for counterpart application CN 202010702368.8, with English machine translation dated Jan. 13, 2022.

* cited by examiner

ELECTROMAGNETIC ACTUATOR WITH IMPROVED SPRING ARRANGEMENT

PRIORITY

This patent application claims priority from Austrian Patent Application Nos. A 50643/2019, filed on Jul. 17, 2019, A 50013/2020, filed on Jan. 10, 2020, A 50441/2020, filed on May 20, 2020, and A 50442/2020, filed on May 20, 2020, the disclosures of which are all incorporated herein, in their entirety, by reference.

BACKGROUND a. Technical Field

The invention relates to an electromagnetic actuator, which is designed to be connected to a backside of a plate like structure opposite to a sound emanating surface of the plate like structure. The electromagnetic actuator comprises at least one voice coil, which has an electrical conductor in the shape of loops running around a coil axis in a loop section, and a magnet system being designed to generate a magnetic field transverse to the conductor in the loop section. Furthermore, the electromagnetic actuator comprises a spring arrangement connecting the at least one voice coil and a movable part of the magnet system and allowing a relative movement between the voice coil and said movable part of the magnet system in an excursion direction parallel to the coil axis. The invention in addition relates to an output device, which comprises a plate like structure with a sound emanating surface and a backside opposite to the sound emanating surface and which comprises an electromagnetic transducer of the above kind connected to said backside.

b. Background Art

An electromagnetic actuator and an output device of the above kind are known. When an input signal is applied to the annular coil arrangement, the magnet system (strictly speaking its movable part) is pushed in the direction of the actuator axis. Because of the inertia of the magnet system, a reaction force is caused, which pushes the coil arrangement in the contrary direction. That is why the plate like structure is deflected and sound according to the input signal is generated.

The known solutions suffer from a number of drawbacks. Generally, any movement between the at least one voice coil and a movable part of the magnet system except of a piston movement (i.e. any movement which is not a translation or linear movement in the direction of the coil axis), does not contribute to sound generation in a desired way. For example rotations around the coil axis and rocking (which is a rotation around an axis perpendicular to the coil axis) as well as linear movements perpendicular to the coil axis just draw energy and do not contribute to the output of sound in a desired way. If there is an influence on the output sound at all, these movements basically cause unwanted deflections in the frequency response of the electromagnetic actuator. Finally, it is of advantage if an air gap between the voice coil and the movable part of the magnet system is made small so as to provide a good efficiency of the electrodynamic transducer. However, the risk of a collision between the voice coil and the movable part of the magnet system based on non-piston movements has to be kept in mind here.

SUMMARY OF THE INVENTION

Thus, it is an object of the invention to overcome the drawbacks of the prior art and to provide a better electromagnetic actuator and a better output device. In particular, the output sound shall be improved in terms of quality and efficiency.

The inventive problem is solved by an electromagnetic actuator (an electrodynamic transducer) as defined in the opening paragraph, wherein the spring arrangement comprises at least two spiral springs, wherein each of the at least two spiral springs comprises at least three spring legs, wherein the spring legs of a spiral spring of the at least two spiral springs run in radial and tangential direction and have an inner end point and an outer end point each and are rotational symmetric around the coil axis (are arranged at different angular positions at equal angular steps and are oriented in the same direction), wherein the inner end point and the outer end point of each spiral spring define a clockwise winding direction for a spiral spring if its spring legs mainly run in a clockwise direction from their inner end points to their outer end points and define a counterclockwise winding direction for a spiral spring if its spring legs mainly run in a counterclockwise direction from their inner end points to their outer end points, and wherein the winding directions of the at least two spiral springs are chosen in a way that rotations around the coil axis caused by a relative movement between the voice coil and the movable part of the magnet system in the excursion direction (which is also denoted as an excursion of the electromagnetic actuator) are oriented in opposite directions.

The inventive problem moreover is solved by an output device, comprising a plate like structure with a (main) sound emanating surface and a backside opposite to the sound emanating surface and comprising an electromagnetic transducer of the above kind connected to said backside (in particular by means of the mounting surface of the at least one voice coil or the magnet system). In particular, the plate like structure can be embodied as a display, wherein the electromagnetic transducer is connected to the backside of the display (in particular by means of the mounting surface of the at least one voice coil or the magnet system). If the electromagnetic transducer is connected to the backside of the display, the output device can output audio and video data.

It should be noted that sound can also emanate from the backside of the plate like structure. However, this backside usually faces an interior space of a device (e.g. a mobile phone), which the output device is built into. Hence, the plate like structure may be considered to have the main sound emanating surface and a secondary sound emanating surface (i.e. said backside). Sound waves emanated by the main sound emanating surface directly reach the user's ear, whereas sound waves emanated by the a secondary sound emanating surface do not directly reach the user's ear, but only indirectly via reflection or excitation of other surfaces of a housing the device, which the output device is built into.

To obtain a long life connection between the electromagnetic actuator and the plate like, sound emanating structure, the at least one voice coil or the magnet system can comprise a flat mounting surface, which is intended to be connected to the backside the plate like structure opposite to the sound emanating surface of the plate like structure, wherein said backside is oriented perpendicularly to the coil axis.

A "spiral spring" in the context of the invention is a spring with spring legs mainly or globally running in a particular winding direction. Hence, the inner end point and outer end point of a spring leg are twisted against each other around the coil axis in a winding direction. In particular, the inner end point and the outer end point of a spring leg may be located at different angular positions. The winding direction can be clockwise or counterclockwise. A spring leg does not necessarily have a spiral shape in the mathematical sense, but may have an arbitrary shape between its inner end point and its outer end point as long as it mainly or globally runs in a "spiral" way. Sections of a spring leg may however run in a different way, for example exactly tangentially or exactly radially. It may also happen that the course of a spring leg changes the winding direction between its endpoints, that means from clockwise to counterclockwise or vice versa, but even these embodiments form a spiral spring, as long as the spring legs mainly or globally run in a "spiral" way.

In a narrower sense, a spring leg runs in the same winding direction over its whole longitudinal extension, for example in clockwise direction from its inner end point to its outer end point or in counterclockwise direction from its inner end point to its outer end point. In this narrower sense, the course of the spring leg does not change from a clockwise direction to a counterclockwise direction or vice versa. This does not mean however that the curvature of the spring leg necessarily is constant over its whole length. Instead the curvature may change, and a spring leg may also comprise a corner or a plurality of corners.

In an even narrower sense, a spring leg has a curvature which continuously changes in a single direction when viewed in a direction parallel to the coil axis. In other words, a spring leg is shaped like a bow or an arc without corners in the course of the spring leg. In this way, the spring leg continuously deflects, when the spiral spring is excursed, i.e. moved out of its idle position. The deflection mostly is based on axial bending and just to a little extend to torsion.

However, as said before, a spring leg may also comprise a corner (i.e. a maximum of the curvature) when viewed in a direction parallel to the coil axis. In this way, a deflection of the spring leg is basically split up into an axial bending part and a torsion part. In detail, the section of the spring leg, which basically runs in tangential direction, is twisted to a substantial extent, whereas the section of the spring leg, which basically runs in radial direction, is less twisted but mostly bent. Accordingly, the spiral spring can be made soft in the excursion direction of the electromagnetic actuator, whereas it is comparably rigid transversal to said excursion direction. However, one should note in the above considerations that the amount of deformation within the spring leg also substantially depends on the position in the course of the spring leg. Regions around the starting point and the endpoint usually are deformed much more than a middle region of the spring leg, in particular if there is a corner at the starting point or end point.

"Movable part of the magnet system" in the context of the disclosure means a part of the magnet system which can relatively move in relation to the at least one voice coil. Generally, a magnet system may have a fixed part, which is fixedly mounted to the voice coil or fixedly mounted in relation to the voice coil, and a movable part. It is also possible, that the whole magnet system is movable in relation to the at least one voice coil. In this case the movable part of the magnet system is the magnet system and there is no fixed part.

The proposed measures offer a number of advantages. First of all, the efficiency of the electromagnetic actuator is very good, because a rotation between the voice coil and the movable part of the magnet system, which just draws energy and does not contribute to the output of sound at all, is avoided. Second, the frequency response of the electromagnetic actuator is not spoiled by a rotation between the voice coil and the movable part of the magnet system. In known systems, the rotation adds a further resonance to the frequency response (in addition to the resonance based on a piston movement between the voice coil and the movable part of the magnet system for example).

Furthermore, the proposed measures allow for electromagnetic actuators with a low tendency to a rocking movement between the voice coil and the movable part of the magnet system. In other words, a resonance frequency for a rocking movement is very high and advantageously outside of the frequency range of the highest excursion, which is the resonance range for a piston motion between the voice coil and the movable part of the magnet system. Tests have shown that the resonance frequency for a rocking movement can be in the range of twice the resonance frequency of the piston motion. In other words, the resonance frequency for a rocking movement can be in the range of around 500 Hz (however, dependent on the resonance frequency of the piston motion which is approximately 200-400 Hz). This is a further reason that the sound quality of an electromagnetic actuator can substantially be enhanced by the proposed measures.

All in all, a movement between the voice coil and the movable part of the magnet system is mainly based on a desired piston movement and not or just to a less extent on an undesired rotation and/or rocking movement.

In case that the spring leg is shaped different to a meander (e.g. because its curvature continuously changes in a single direction), the spring leg moves within the space between the starting point and the endpoint of the spring leg. Accordingly, no additional space is needed for the movement (or strictly speaking the deflection) of the spring leg, like this is the case for spring legs, which are shaped like a meander. Meander spring legs tend to move outward a moving range between the starting point and the endpoint of the spring leg. In other words, meander spring legs tend to exceed the moving range between the starting point and the endpoint of the spring leg in a direction parallel to the coil axis. This also means that the slope of a meander spring (seen in a direction transverse to the coil axis) changes from positive to negative values throughout its course between the starting point and the endpoint of the spring leg. Thus additional space is needed in axial direction for the movement of the spring (i.e. the space exceeding the space, which actually would be needed for a movement between the starting point and the endpoint of the spring leg if the meander spring did not change from positive to negative values). This is disadvantageous in applications which should be as thin as possible (e.g. when the electromagnetic actuator is built in a portable handheld device like a tablet computer or a mobile phone).

Although the proposed measures are very advantageous in combination with non-meander spring legs, nonetheless they can also be applied to spring legs, which are shaped like a meander when viewed in a direction parallel to the coil axis. In this way, the spring leg can be made relatively long within a comparably small angular sector of the spiral spring. In turn, such a spring leg allows for a substantial relative movement between the voice coil and the movable part of the magnet system (i.e. a substantial excursion of the electromagnetic actuator) and hence for a comparably high output power.

Additionally, the proposed measures are very favorable in case of non-circular voice coils, i.e. for voice coils having a polygonal shape (in particular rectangular) or an oval shape when viewed in a direction parallel to the coil axis. Because a rotation between the voice coil and the movable part of the magnet system is avoided or at least reduced, the air gap between the voice coil and the movable part of the magnet system can be made very small without risking a collision between the voice coil and the movable part of the magnet system. In turn, the efficiency of the electromagnetic actuator can be enhanced further. Although the proposed measures are very advantageous in combination with non-circular voice coils, nonetheless they can also be applied to electromagnetic actuators with circular voice coils.

Further details and advantages of the electromagnetic actuator of the disclosed kind will become apparent in the following description and the accompanying drawings.

Beneficially, the spring arrangement comprises at least two separate (non-connected) spiral springs, which are each arranged between the voice coil and the movable part of the magnet system and which are arranged at different axial positions along the coil axis. In this way, a rocking movement can be suppressed even better, because an interconnection between the voice coil and the movable part of the magnet system is provided at two different (and thus spaced) axial locations.

In an advantageous embodiment, the at least two spiral springs are wound in the same direction and excursed in opposite directions with respect to their spring idle position in an actuator idle position of the magnet system/the voice coil, wherein the spring idle position is a position of a spiral spring, in which outer end points and inner end points of all spring legs of the spiral spring are all arranged in a plane perpendicular to the coil axis, and wherein the actuator idle position indicates the relative position between the voice coil and the movable part of the magnet system when no current flows through the at least one voice coil.

In this embodiment, an axial displacement between the inner endpoints and the outer endpoints of the spring legs is done in different directions for the spiral springs in the actuator idle position. For example, the inner endpoints are displaced relative to the outer endpoints in a positive excursion direction of the electromagnetic actuator for a first spring, whereas the inner endpoints are displaced relative to the outer endpoints in a negative excursion direction of the electromagnetic actuator for a second spring. When the electromagnetic actuator is excursed, one of the first and the second spring moves towards its idle position, whereas the other one of the first and the second spring moves away from its idle position. In turn, the springs generate contrary rotational forces because of their (identical) winding direction when the electromagnetic actuator is excursed.

Generally do note, that the spring idle position in the context of this disclosure does not necessarily mean that no force is generated by the spring in the spring idle position, but the spring idle position is defined by the geometry of the spring in a particular state. Nonetheless it is possible, that the spring idle position coincides with the position of the spring, in which no force is generated. Do also note that generally the spiral springs can be biased in the actuator idle position of the electromagnetic actuator, i.e. they can generate a force when no current flows through the at least one voice coil and reach their zero force position when the electromagnetic actuator is excursed.

In another advantageous embodiment, the at least two spiral springs are wound in opposite directions and a) are in their spring idle position in the actuator idle position of the magnet system/the voice coil, or b) are excursed in the same direction in relation to their spring idle position in the actuator idle position of the magnet system/the voice coil, wherein in cases a) and b) the spring idle position is a position of a spiral spring, in which outer end points and inner end points of all spring legs of the spiral spring are all arranged in a plane perpendicular to the coil axis, and wherein the actuator idle position indicates the relative position between the voice coil and the magnet system when no current flows through the at least one voice coil.

In this embodiment, an axial displacement between the inner endpoint and the outer endpoints of the spring legs for both spiral springs is done in the same direction when the electromagnetic actuator is excursed. In turn, the springs generate contrary rotational forces because of their (different) winding directions when the electromagnetic actuator is excursed. Two cases are imaginable. First, the spiral springs can be in their spring idle position in the actuator idle position of the magnet system/the voice coil (case a), and second there may be an axial displacement between the inner endpoints and the outer endpoints of the spring legs of the spiral springs in the actuator idle position of the magnet system/the voice coil (case b). Beneficially, any displacement between the inner endpoints and the outer endpoints of the spring legs of the spiral springs is the same for identical spiral springs resulting in a zero rotation movement. This is also true if the force excursion graph in the excursion direction of the electromagnetic actuator is non linear. Anyhow, also different displacements between the inner endpoint and the outer endpoints of the spring legs and/or different spiral springs can be used.

In a very advantageous embodiment of the electromagnetic actuator, the spring arrangement comprises at least two spiral springs, which are wound in opposite directions and are nested radially (i.e. connected and switched in series). In other words, one spiral spring is arranged within the other spiral spring in radial direction when viewed in a direction parallel to the coil axis. In this way, the spring arrangement is very flat what means that little space is needed for the spring arrangement in the excursion direction of the electromagnetic actuator. This is particularly true if the inner end points of the inner spiral spring and the outer end points of the outer spiral spring are located in different planes perpendicular to the coil axis in the actuator idle position. However, the least two spiral springs can also be arranged in the same plane perpendicular to the coil axis in their spring idle positions wherein the spring idle position again is a position of a spiral spring, in which outer end points and inner end points of all spring legs of the spiral spring are all arranged in a plane perpendicular to the coil axis. Beneficially, the above measures allow for very flat electromagnetic actuators what is favorable if the electromagnetic actuator is built in a portable handheld device.

In yet another very advantageous embodiment of the electromagnetic actuator a connecting ring is arranged between said at least two spiral springs and connects the same. In other words the inner end points of all spring legs of the outer spiral spring are interconnected by the connecting ring, and the outer end points of all spring legs of the inner spiral spring are interconnected by the connecting ring. This ring substantially stabilizes the spring arrangement and in particular avoids an excessive rocking movement. Tests have shown that the resonance frequency for a rocking movement can be in the range of four times the resonance frequency of the piston motion frequency in this embodiment. This is particularly true for an electromagnetic actuator with spring arrangements, which are arranged at different axial positions along the coil axis and which have nested spiral springs each. The connecting ring can be arranged in the middle of the radial extension of the spring arrangement. However, it can also be located in the outer half so as to provide more space for the inner spiral spring. In an advantageous embodiment, the area seized by the inner spiral spring substantially equals the area seized by the outer spiral spring when viewed in a direction parallel to the coil axis. "Substantially equal" in this context in particular means a deviation by less than 10%.

Beneficially, the at least two spiral springs are concentric. In this way, the spring arrangement moves symmetrically when it is excursed.

Advantageously, a sum of rotation angles of the at least two spiral springs is less than 5° over the full nominal excursion range of the electromagnetic actuator. By the above measures, the voice coil is not rotated much against the movable part of the magnet system around the coil axis when there is a relative movement between the voice coil and the movable part of the magnet system in excursion direction, that means when the electromagnetic actuator is excursed. The "rotation angle" of a spiral spring means the amount of a rotational movement between the inner end points and the outer end points of the spring legs of the spiral spring. If the spiral spring comprises an annular outer holder and a center holder, then the rotational angle also describes the amount of a rotational movement between the annular outer holder and the center holder.

In a further beneficial embodiment of the electromagnetic actuator, the at least two spiral springs are made of metal, made of plastics or made of a combination thereof. These are materials which allow for a high number of excursions and thus for a long life time of the electromagnetic actuator. A combination of metal and plastics in particular means a metal spring which is coated with plastics.

In particular, said metal can be steel, brass, bronze, molybdenum or tungsten. It is advantageous, if the springs are made of a stainless steel, and it is very advantageous if the springs are made of a cold-rolled stainless steel with a fatigue strength in a range of 370 to 670 $N/mm^2$ or an ultimate tensile strength in a range of 1100 to 2000 $N/mm^2$. Beneficially, austenitic stainless steel can be used for the springs, in particular stainless steel 1.4404. Austenitic stainless steels have a high share of austenite and as such are non-ferromagnetic or low-ferromagnetic. Accordingly no or just low (unwanted) forces are induced into the springs when they move in the magnetic field in the air gap of the magnet system. Such forces could shift the (dynamic) idle position of the electromagnetic actuator and deteriorate the characteristics of the electromagnetic actuator. Moreover, austenitic stainless steel does not or does not substantially magnetically bridge the air gap of the magnet system. In other words, the springs do not form magnetic short circuits in the magnet system. Furthermore, stainless steel, in addition to its characteristics presented before, provides the advantage that it is resistant against oxidation. In particular, the coating can consist of a polymer (e.g. a thermoplastics, a thermosetting plastic, an elastomer, silicone or rubber)

The "fatigue strength" (or endurance limit or fatigue limit), generally is the stress level below which an infinite number of loading cycles can be applied to a material without causing fatigue failure or inadmissible deformation. Above this stress level, fatigue failure or inadmissible deformation occurs in some point of time.

The "ultimate tensile strength" is the maximum stress that a material can withstand while being stretched or pulled before breaking (in case of a single load). The ultimate tensile strength, as a rule of thumb, is about three times the fatigue strength for metals.

Beneficially, the spring arrangement comprises exactly two spiral springs. In this way, a minimum number of spiral springs is used to avoid a substantial rotation between the voice coil and the movable part of the magnet system.

In another beneficial embodiment, the at least two spiral springs have the same thickness. In other words, at least two spiral springs have the same extension in a direction parallel to the coil axis. In particular if the at least two spiral springs are nested radially, a plate like basic material can be used for manufacturing the spring arrangement.

Beneficially, the length of a spring leg is at least 30% of a circumference of a circle running through the inner starting point of the spring leg. In this way, the spiral spring allows for a substantial relative movement between the voice coil and the movable part of the magnet system (i.e. a substantial excursion of the electromagnetic actuator) and hence for a comparably high output power, too.

In a further beneficial embodiment, the length of all spring legs of a spring arrangement is the same. In this way, uniform characteristics of the spiral springs are obtained.

It is also of advantage if the lengths of the spring legs of a spring arrangement is different. In this way, uniform characteristics of the spiral springs can be obtained for different spring geometries. For example, the inner spiral spring of two nested spiral springs can have shorter spring legs than the outer spiral spring. In this way, different available space for the inner and the outer spiral spring is considered. In this context it is advantageous if a ring connecting the at least two spiral springs is located in the outer half so as to provide more space for the inner spiral spring. It may also beneficial, if the spring legs of the inner spring are made narrower and/or thinner than the spring legs of the outer spring wherein the width of a spring leg is the extension of its cross section in a plane parallel to the coil axis and wherein the thickness of a spring leg is its extension in a direction parallel to the coil axis.

Generally, do note that different spiral springs do not have to contribute to an axial force in the same way. Instead, the focus is put on the cancellation or at least reduction of a total rotational movement.

In another beneficial embodiment of the electromagnetic actuator all spring legs of the at least two spiral springs are of identical shape. In this way, uniform characteristics of the spiral springs are obtained.

Beneficially, the at least two spiral springs each have the same number of spring legs. In this way, uniform characteristics of the spiral springs are obtained as well.

It is also of advantage if the at least two spiral springs have different numbers of spring legs. In this way, uniform characteristics of the spiral springs can be obtained for different spring geometries. For example, the inner spiral spring of two nested spiral springs can have less spring legs than the outer spiral spring. In this way, empty spaces between the spring legs of comparable size can be provided for both the inner and the outer spiral spring what is beneficial if the spring arrangement is made by punching.

In yet another advantageous embodiment of the electromagnetic actuator, a width of a spring leg (which is the extension of a spring legs cross section in a plane parallel to the coil axis) is 2 to 10 times a thickness of the spring leg (which is the extension of a spring leg in a direction parallel to the coil axis). In this way, the spring can be made comparably soft in the excursion direction which allows for high output power, whereas undesired lateral movement is substantially hindered.

Beneficially, an average sound pressure level of the output device measured in an orthogonal distance of 10 cm from the sound emanating surface is at least 50 dB_SPL in a frequency range from 100 Hz to 15 kHz. "Average sound pressure level $SPL_{AVG}$" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In particular, the above average sound pressure level is measured at 1 W electrical power more particularly at the nominal impedance. The unit "dB_SPL" generally denotes the sound pressure level relative to the threshold of audibility, which is 20 µPa.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

FIG. 11 shows a top view of a spring arrangement with nested spiral springs and a connecting ring in-between.

Like reference numbers refer to like or equivalent parts in the several views.

DETAILED DESCRIPTION OF EMBODIMENTS

Figure 1:
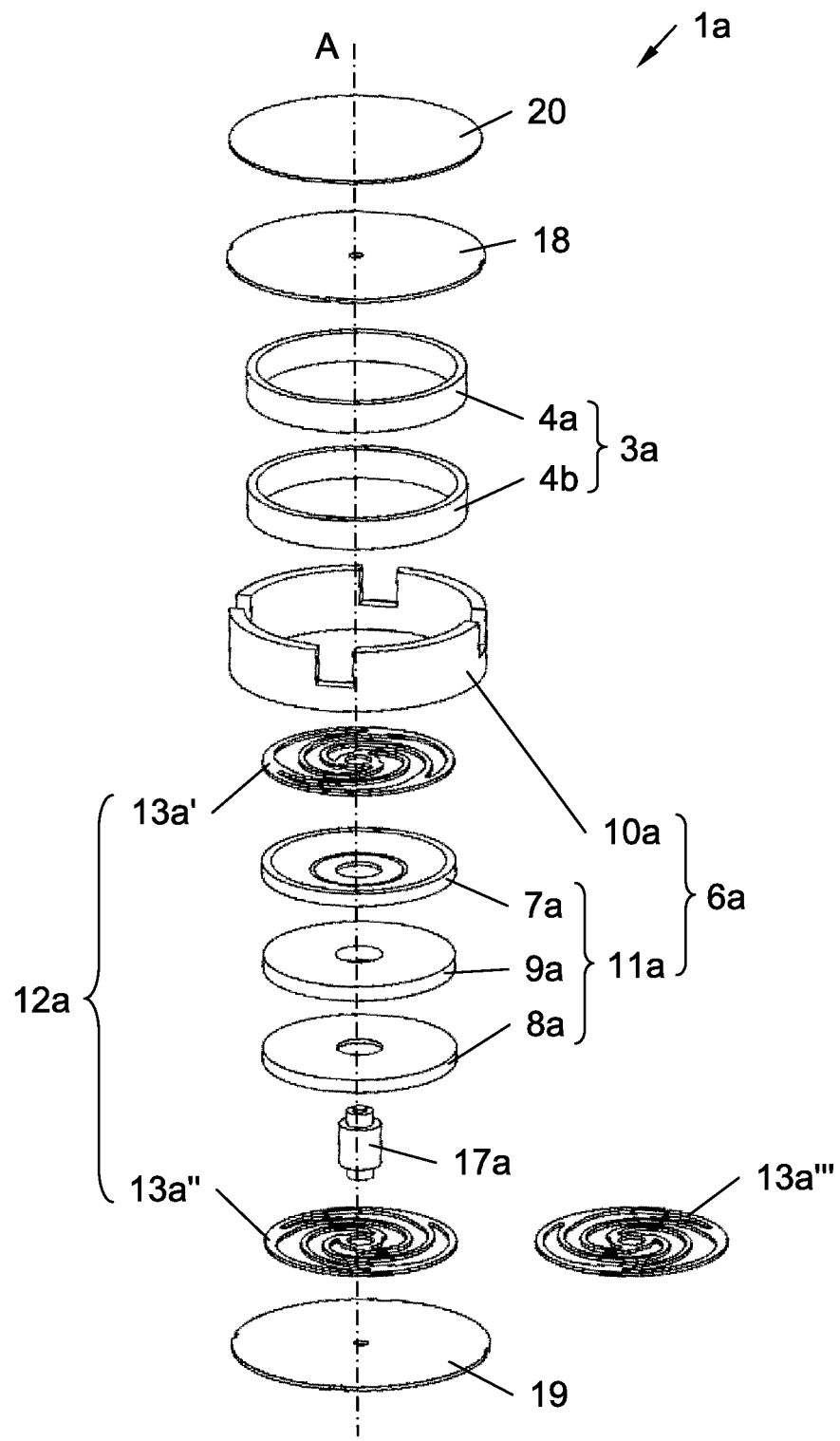
FIG. 1 shows a first embodiment of an electromagnetic actuator with two separate spiral springs in exploded view.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially," which particularly means a deviation of ±10% from a reference value.

Figure 2:
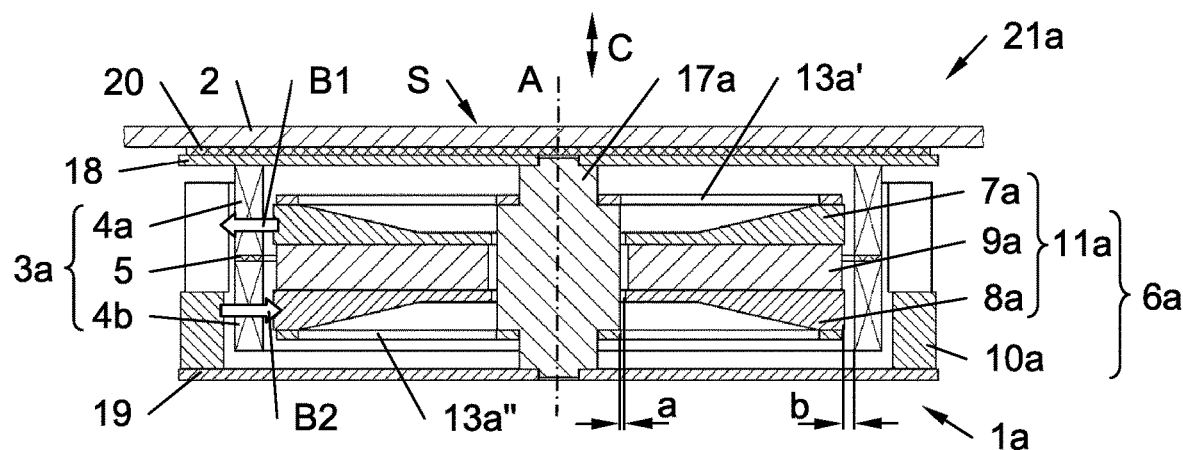
FIG. 2 shows the electromagnetic actuator of FIG. 1 in sectional view.
Figure 7:
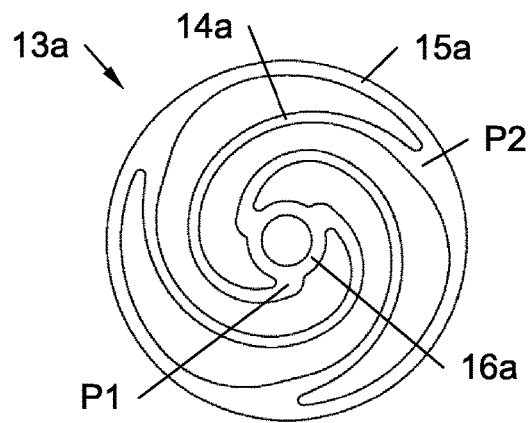
FIG. 7 shows a top view of the spiral spring, which is used in the embodiment of FIG. 1.

A first example of an electromagnetic actuator 1a is disclosed by use of the FIGS. 1, 2 and 7. FIG. 1 shows an exploded view of the electromagnetic actuator 1a, FIG. 2 shows a cross sectional view of the electromagnetic actuator 1a, and FIG. 7 shows a top view of a spring arrangement used in the electromagnetic actuator 1a.

Generally, the electromagnetic actuator 1a is designed to be connected to a backside of a plate like structure 2 opposite to a sound emanating surface S of the plate like structure 2 (see FIG. 2). For example, the plate like structure 2 can be a display. The electromagnetic actuator 1a has an annular coil arrangement 3a, which in this example comprises a first voice coil 4a and a second voice coil 4b stacked above another and connected to each other by means of a glue layer 5. However, it is also possible that the electromagnetic actuator 1a comprises just one voice coil 4a. In any case, a voice coil 4a, 4b has an electrical conductor in the shape of loops running around a coil axis (or actuator axis) A in a loop section.

The electromagnetic actuator 1a furthermore comprises a magnet system 6a, which in this example comprises a top plate 7a from soft iron, a bottom plate 8a from soft iron, a center magnet 9a, which is mounted to the top plate 7a and to the bottom plate 8a, and an outer ring 10a from soft iron. The top plate 7a, the bottom plate 8a and the center magnet 9a are comprised of the movable part 11a of the magnet system 6a or these parts may even form the movable part 11a of the magnet system 6a. The outer ring 10a is comprised of the fixed part of the magnet system 6a or it may even form the fixed part of the magnet system 6a. Accordingly, the fixed part of the magnet system 6a may be denoted with the reference sign of the outer ring 10a as the case may be. Both the top plate 7a and the bottom plate 8a are disc shaped, wherein the top plate 7a is arranged vis-a-vis of the first voice coil 4a and the bottom plate 8a is arranged vis-a-vis of the second voice coil 4b. The fixed part of the magnet system 6a, which is the outer ring 10a in this example, is arranged around the annular coil arrangement 3a vis-a-vis of both the first voice coil 4a and the second voice coil 4b.

The magnet system 6a generally is designed to generate a magnetic field B1, B2 transverse to a longitudinal direction of the electrical conductor of the annular coil arrangement 3a wound around the coil axis (or actuator axis) A. In detail, the magnetic field B1 passes the first voice coil 4a from the inner side of the annular coil arrangement 3a to the outer side of the annular coil arrangement 3a, and the magnetic field B2 passes the second voice coil 4b from the outer side of the annular coil arrangement 3a to the inner side of the annular coil arrangement 3a.

The annular coil arrangement 3a and the movable part 11a of the magnet system 6a are connected to each other by a spring arrangement 12a. In this example, the spring arrangement 12a comprises two spiral springs 13a', 13a". Each of the at least two spiral springs 13a', 13a" comprises three spring legs 14a (see FIG. 7). In detail, each of the first and the second spiral spring 13a', 13a" of the spring arrangement 12a additionally comprises an annular outer holder 15a and a center holder 16a inside of the annular outer holder 15a. The plurality of spring legs 14a is arranged between the annular outer holder 15a and the center holder 16a and fixed thereto. In detail, the inner end point P1 of the spring leg 14a is connected to the center holder 16, and the outer end point P2 of the spring leg 14a is connected to the annular outer holder 15a. In particular, each of the first and the second spiral spring 13a', 13a" is one piece like this is the case in the example of FIG. 7. By the aforementioned measures, the spring legs 14a can be held in position, and assembly of the electromagnetic actuator 1a is simplified.

The spring legs 14a of the two spiral springs 13a', 13a" run in radial and tangential direction from their inner end points P1 to their outer end points P2 and are rotational symmetric around the coil axis A. In particular, the spring legs 14a are arranged at different angular positions at equal angular steps and are oriented in the same direction.

The inner end point P1 and the outer end point P2 of each spiral spring leg 14a define a clockwise winding direction for the spiral spring 13a', 13a" if its spring legs 14a mainly run in a clockwise direction from their inner end points P1 to their outer end points P2 and define a counterclockwise winding direction for a spiral spring 13a', 13a" if its spring legs 14a mainly run in a counterclockwise direction from their inner end points P1 to their outer end points P2.

In this example, the first spiral spring 13a' has a clockwise winding direction and the second spiral spring 13a" has a counterclockwise winding direction (when viewed from above). Moreover, in this example, in fact, the second spiral spring 13a" has the same shape like the first spiral spring 13a', but is flipped around an horizontal axis (an axis perpendicular to the coil axis A) to obtain different winding directions. This is advantageous, but not mandatory. The second spiral spring 13a" may also have a shape different from that of the first spiral spring 13a', which cannot be obtained by a simple flipping operation.

Generally, the spring arrangement 12a connects the voice coils 4a, 4b and the movable part 11a of the magnet system 6a in a way that allows a relative movement between the voice coils 4a, 4b and the movable part 11a of the magnet system 6a in an excursion direction C parallel to the coil axis A.

In the above example, each of the at least two spiral springs 13a', 13a" comprises three spring legs 14a, but it should be notified that each of the at least two spiral springs 13a', 13a" could also comprise more than three spring legs 14a.

The electromagnetic actuator 1a of this example furthermore comprises a center connector 17a fixedly arranged relative to the plate like structure 2. In more detail, a center holder 16a of the first spiral spring 13a' is mounted to the center connector 17a, and a center holder 16a of a second spiral spring 13a" is mounted to the center connector 17a at a distance from the center holder 16a of the first spiral spring 13a'.

The movable part 11a of the magnet system 6a is arranged between an annular outer holder 15a of the first spiral spring 13a' and an annular outer holder 15a of the second spiral spring 13a", wherein the top plate 7a is mounted to the annular outer holder 15a of the first spiral spring 13a', and the bottom plate 8a is mounted to the annular outer holder 15a of the second spiral spring 13a". Moreover, the fixed part 10a of the magnet system 6a is mounted to the center connector 17a, in particular outside of the first spiral spring 13a' and the second spiral spring 13a". By these measures, a rocking movement of the movable part 11a of the magnet system 6a generally can be kept low because the mounting points of the movable parts 11a of the magnet system 6a are located at an axial distance.

Finally, the electromagnetic actuator 1a comprises a top mounting plate 18 on the upper end of the center connector 17a and a bottom mounting plate 19 on the lower end of the center connector 17a. The top mounting plate 18 connects the center connector 17a and the annular coil arrangement 3a, and the bottom mounting plate 19 connects the center connector 17a and the outer ring 10a of the magnet system 6a. Moreover, an adhesive sheet 20 is arranged on the upper side of the top mounting plate 18, by means of which the electromagnetic actuator 1a is mounted to the backside of the plate like structure 2. However, a glue layer may be used for this reason as well. Accordingly, the upper surface of the top mounting plate 18 forms a flat mounting surface for the plate like structure 2. Beneficially, the connecting area between the plate like structure 2 and the annular outer holder 15a is comparably large in this embodiment.

When an input signal is applied to the voice coils 4a, 4b of the coil arrangement 3a, the movable part 11a of the magnet system 6a is pushed in the excursion direction C, that means up or down. Because of the inertia of said movable part 11a, a reaction force is caused, which pushes the coil arrangement 3a in the contrary direction. That is why the plate like structure 2 is deflected and sound according to the input signal is generated. It should be noted, that the current flows through the voice coils 4a, 4b in opposite directions so that the electromagnetic forces generated by the voice coils 4a, 4b are summed. The voice coils 4a, 4b are beneficially wired in parallel or in series so that the inductance is reduced by the opposite direction of the induced magnetic fields B1, B2 of both voice coils 4a, 4b.

The electromagnetic actuator 1a together with the plate like structure 2 forms an output device 21a for audio data, in case that the plate like structure 2 is embodied as a display for both audio and video data. The sound emanating surface S of the plate like structure 2 is its upper surface, and the electromagnetic actuator 1a is arranged opposite thereof. It should be noted that of course sound is not only emanated upwards, but also emanated downwards. However, the lower surface of the plate like structure 2 usually faces an interior space of a device (e.g. a mobile phone), which the output device 21a is built into. Hence, the plate like structure 2 may be considered to have a main sound emanating surface S (here the upper surface) and a secondary sound emanating surface (here the lower surface). Sound waves emanated by the a main sound emanating surface S directly reach the user's ear, whereas sound waves emanated by the a secondary sound emanating surface do not directly reach the user's ear, but only indirectly via reflection or excitation of other surfaces of a housing the device, which the output device 21a is built into.

Generally, the winding directions of the at least two spiral springs 13a', 13a" are chosen in a way that rotations around the coil axis A caused by a relative movement between the voice coils 4a, 4b and the movable part 11a of the magnet system 6a in the excursion direction C are oriented in opposite directions. This can be done in a number of way according to the invention.

In the example shown in FIGS. 1, 2 and 7, the two spiral springs 13a', 13a" are wound in opposite directions, and they are in their spring idle position in the actuator idle position of the magnet system 6a/the voice coils 4a, 4b (case a). Generally, the spring idle position is a position of a spiral spring 13a', 13a", in which inner end points P1 and outer end points P2 of all spring legs 14a of the spiral spring 13a', 13a" are all arranged in a plane perpendicular to the coil axis A (see FIG. 2). The actuator idle position indicates the relative position between the voice coils 4a, 4b and the magnet system 6a when no current flows through the voice coils 4a, 4b.

If an asymmetric behavior of the two spiral springs 13a', 13a" is needed in terms of the force generated during a movement upwards from the actuator idle position and downwards from the actuator idle position, the spiral springs 13a', 13a" can also be excursed in the same direction in relation to their spring idle position in the actuator idle position of the magnet system 6a/the voice coils 4a, 4b (case b).

In both embodiments (cases a and b), an axial displacement between the inner end points P1 and the outer end points P2 of the spring legs 14a of both spiral springs 13a', 13a" is done in the same direction when the electromagnetic actuator 1a is excursed. In turn, the spiral springs 13a', 13a" generate contrary rotational forces because of their (different) winding directions when the electromagnetic actuator 1a is excursed. Beneficially, any displacement between the inner end points P1 and the outer end points P2 of the spring legs 14a of the spiral springs 13a', 13a" is the same for identical spiral springs 13a', 13a" resulting in a zero rotation movement. This is also true if the force excursion graph in the excursion direction C of the electromagnetic actuator 1a is non-linear. Anyhow, also different displacements between the inner end points P1 and the outer end points P2 of the spring legs 14a and/or different spiral springs 13a', 13a" can be used.

Generally it is of advantage if an air gap a between the movable part 11a of the magnet system 6a and the center connector 17a is smaller than an air gap b between the movable part 11a of the magnet system 6a and the annular coil arrangement 3a in this example, wherein the gaps a and b are each measured in a direction perpendicular to the actuator axis A. In particular the smallest gap a and the smallest gap b is taken for the above considerations. By the proposed measures, a lateral acceleration of the electromagnetic actuator 1a transverse to a direction of the actuator axis A cannot cause a collision of the movable part 11a of the magnet system 6a with the coil arrangement 3a and in turn cannot cause damage of the coil arrangement 3a. Instead, the movable part 11a of the magnet system 6a can just collide with the center connector 17a. Generally, a lateral acceleration of the aforementioned kind may be caused, when a device with the electromagnetic actuator 1a (e.g. a mobile phone) falls down and hits the floor.

Figure 3:
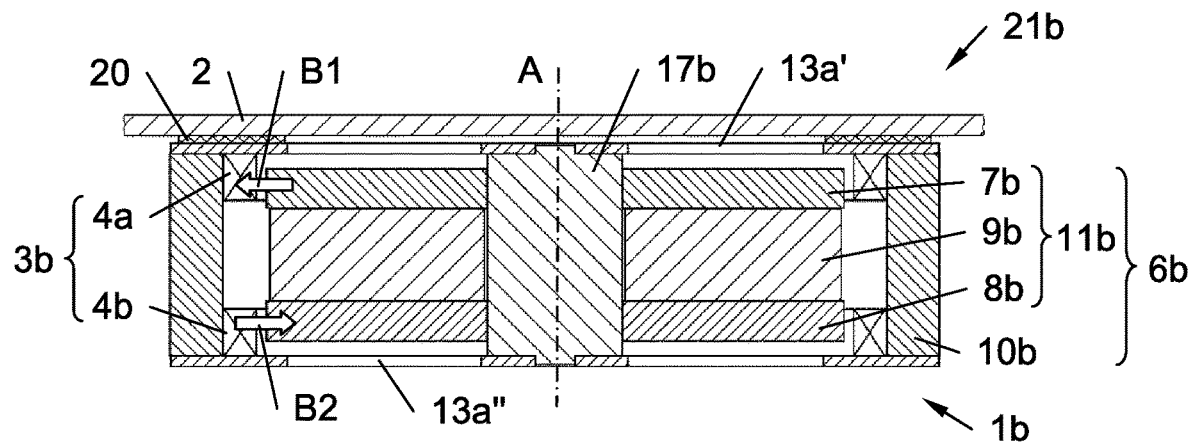
FIG. 3 shows a second embodiment of an electromagnetic actuator with a movable center connector in sectional view.

FIG. 3 now shows another example of an electromagnetic actuator 1b, which is similar to the electromagnetic actuator 1a of FIG. 2. In contrast, the top plate 7b, the bottom plate 8b and the center magnet 9b, which form the movable part 11b of the magnet system 6b, are connected to the center connector 17b. In detail, a center holder 16a of a first spiral spring 13a' is mounted to the center connector 17b at a first position, and a center holder 16a of a second spiral spring 13a" is mounted to the center connector 17b at a second position at a distance from the center holder 16a of the first spiral spring 13a'. Thus, the center connector 17b is movably arranged relative to the plate like structure 2. Again, the electromagnetic actuator 1b together with the plate like structure 2 forms an output device 21b for audio data, in case that the plate like structure 2 is embodied as a display for both audio and video data.

In this example, the fixed part of the magnet system 6b, which is the outer ring 10b here, is connected to the annular outer holders 15a of the first spiral spring°13a' and the second spiral spring°13a".

In the embodiment of FIG. 3, the coil arrangement 3b touches the outer ring 10b or is connected thereto. In this way, a collision of the movable part 11b of the magnet system 6b does not cause a substantial damage of the coil arrangement 3b, which is supported by the outer ring 10b in lateral direction. In principle, it is sufficient if the coil arrangement 3b touches the outer ring 10b for the aforementioned supporting function. Also, a small (and unavoidable) gap between the coil arrangement 3b and the outer ring 10b does not substantially deteriorate said supporting function. However, to avoid any air gap between the coil arrangement 3b and the outer ring 10b, the coil arrangement 3b can be connected to the outer ring 10b, e.g. by means of an adhesive. Another advantage of this embodiment is that the magnetic gap between the coil arrangement 3b and the outer ring 10b is zero or almost zero. Thus, in total there is just a single magnetic gap between a voice coil 4a, 4b and the magnet system 6b. In that, the electromagnetic actuator 1b is very efficient. Another advantage of connecting the coil arrangement 3b to said outer ring 10b is the improved heat dissipation and temperature averaging. Heat generated within the coil arrangement 3b caused by the current flowing through the same can flow into the outer ring 10b thus improving heat dissipation because of the enlarged (outer) surface on the one hand and also averaging the temperature within the coil arrangement 3b because of the higher thermal mass on the other hand. The embodiment of FIG. 3 moreover benefits from the voice coils 4a, 4b being spaced from one another because the enlarged surface of the coil arrangement 3b in comparison to connected voice coils 4a, 4b improves heat dissipation as well.

One should also note that the voice coils 4a and 4b of the coil arrangement 3b are located at an axial distance from one another what provides more design freedom in terms of the height of the top plate 7b, the bottom plate 8b and the center magnet 9b in relation to the height of the voice coils 4a and 4b. Nevertheless, also stacked (interconnected) voice coils 4a and 4b can be used in the electromagnetic actuator 1b shown in FIG. 3.

Figure 4:
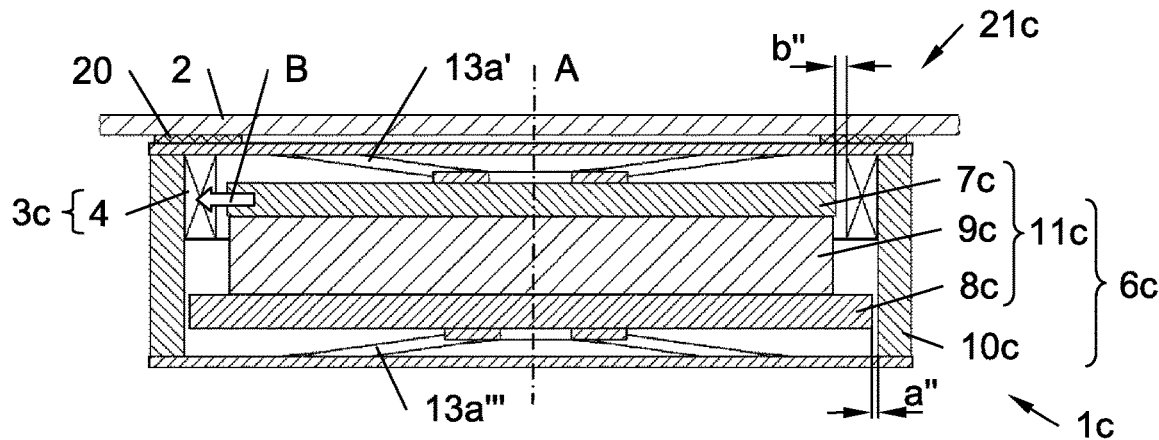
FIG. 4 shows a third embodiment of an electromagnetic actuator with spiral springs in a non-idle state in sectional view.

FIG. 4 shows another embodiment of an electromagnetic actuator 1c, which is similar to the electromagnetic actuator 1b of FIG. 3. In contrast, no center connector 17b is used. Instead, the center holder 16a of the first spiral spring 13a' is mounted to the top plate 7c, and the center holder 16a of a second spiral spring 13a''' is mounted to the bottom plate 8c.

Again, the top plate 7c, the bottom plate 8c and the center magnet 9c form the movable part 11c of the magnet system 6c, and the outer ring 10c forms the fixed part of the magnet system 6c. Again, the electromagnetic actuator 1c together with the plate like structure 2 forms an output device 21c for audio data, in case that the plate like structure 2 is embodied as a display for both audio and video data.

In this case, a second spiral spring 13a''' is used instead of the second spiral spring 13a" (see the second spiral spring 13a''' on the right side of FIG. 1). In other words, the second spiral spring 13a''' is not obtained by flipping the first spiral spring 13a' around an horizontal axis. In this particular case, identical shapes for the first spiral spring 13a' and the second spiral spring 13a''' are used, but different shapes for the first spiral spring 13a' and the second spiral spring 13a''' may be used as well.

In this embodiment, the two spiral springs 13a', 13a''' are wound in the same direction and excursed in opposite directions with respect to their spring idle position in an actuator idle position of the magnet system 6c/the voice coil 4. Again, the spring idle position is a position of a spiral spring 13a', 13a''', in which inner end points P1 and outer end points P2 of all spring legs 14a of the spiral spring 13a', 13a''' are all arranged in a plane perpendicular to the coil axis A, and the actuator idle position indicates the relative position between the voice coil 4 and the movable part 11c of the magnet system 6c when no current flows through the voice coil 4.

In this embodiment, the inner end points P1 of the first (upper) spiral spring 13a' are displaced relative to the outer endpoints P2 in a downward excursion direction C of the electrodynamic transducer 1c, whereas the inner endpoints P1 of the second (lower) spiral spring 13a''' are displaced relative to the outer endpoints P2 in an upward excursion direction C of the electrodynamic transducer 1c. When the electrodynamic transducer 1c is excursed upwards, the first spiral spring 13a' moves towards its idle position, whereas the second spiral spring 13a''' moves away from its idle position and vice versa. In turn, the spiral springs 13a', 13a''' generate contrary rotational forces because of their (identical) winding direction when the electrodynamic transducer 1c is excursed.

Generally do note, that the spring idle position in the context of this disclosure does not necessarily mean that no force is generated by the spiral springs 13a' . . . 13a''' in the spring idle position, but the spring idle position is defined by the geometry of the spiral springs 13a' . . . 13a''' in a particular state. Nonetheless it is possible, that the spring idle position coincides with the position of the spiral springs 13a' . . . 13a''', in which no force is generated.

Generally, it is of advantage if the spiral springs 13a' . . . 13a''' are biased in the actuator idle position of the electromagnetic actuator 1a . . . 1c, i.e. they do generate a force when no current flows through the at least one voice coil 4, 4a, 4c and reach their zero force position when the electromagnetic actuator 1a . . . 1c is excursed. In this way, manufacturing of the electromagnetic actuator 1a . . . 1c can be made easier because the spiral springs 13a' . . . 13a''' need not to be bent before assembly of the electromagnetic actuator 1a . . . 1c. Instead, the inner end points P1 of the spring legs 14a are moved out of the plane formed by the outer end points P2 of the spring legs 14a when the electromagnetic actuator 1a . . . 1c is assembled. Further on, the spiral springs 13a' . . . 13a''' keep their preloaded state in the idle position of the movable parts of the finalized electromagnetic actuator 1a . . . 1c.

It should be noted that the above measures are not limited to the embodiment of FIG. 4, but may be applied to the spring arrangements 12a in general. Accordingly, the spiral springs 13a' . . . 13a''' can be biased in the actuator idle position of the electromagnetic actuators 1a . . . 1c.

The coil arrangement 3c of the electromagnetic actuator 1c of FIG. 4 comprises just a single voice coil 4, which touches the outer ring 10c or is connected thereto for the same reasons presented in context with the electromagnetic actuator 1b of FIG. 3. For improved safety, an air gap a" between the movable part 11c of the magnet system 6c and the fixed part of the magnet system 6c, which is the outer ring 10c here, is smaller than an air gap b" between the movable part 11c of the magnet system 6c and the annular coil arrangement 3c, each measured in a direction perpendicular to the actuator axis A. So, the movable part 11c of the magnet system 6c usually cannot collide with the coil arrangement 3c. But even if it does, the coil arrangement 3c is supported by the outer ring 10c.

The use of both measures is beneficial. However, it is also possible only to use either the supporting function of the outer ring 10c or the aforementioned condition for the gaps a" and b".

In the example of FIG. 7, the spring legs 14a of the spiral spring 13a are arranged between an annular outer holder 15a and a center holder 16a. They are symmetrically shaped around the coil axis A and are spirally and arc shaped there. The spring legs 14a have a curvature which continuously changes in a single direction when viewed in a direction parallel to the coil axis A. In particular, the spring legs 14a in the example of FIG. 7 are symmetrically shaped around the coil axis A. By these measures, a comparably large spring length in a relatively small radial room can be obtained.

Figure 8:
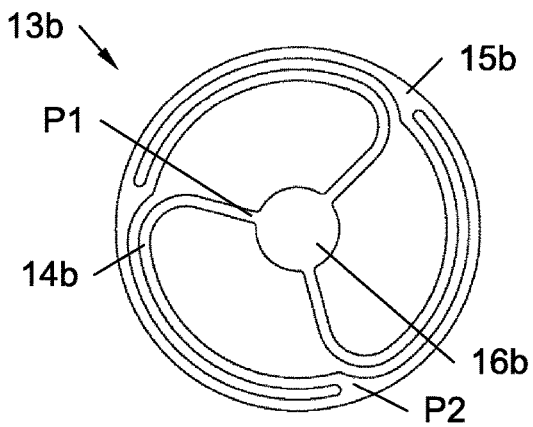
FIG. 8 shows a top view of a spiral spring with dedicated radial and circumferential spring leg sections.

FIG. 8 shows another spiral spring 13b with spring legs 14b, which are arranged between an annular outer holder 15b and a center holder 16b. The spring legs 14b are symmetrically shaped around the coil axis A and are spirally shaped, too. However, in contrast to the embodiment shown in FIG. 7, the spring legs 14b of the spiral spring 13b do not have a curvature which continuously changes in a single direction when viewed in a direction parallel to the coil axis A, but comprise a maximum of the curvature when viewed in a direction parallel to the coil axis A. Basically, a spring leg 14b is split into a radial part adjacent to its inner end point P1 and a circumferential part adjacent to its outer end point P2.

Figure 9:
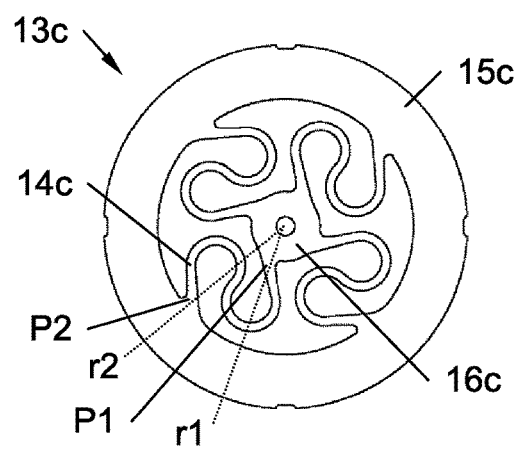
FIG. 9 shows a top view of a spiral spring with spring legs shaped like meanders.

FIG. 9 shows an alternative embodiment of a spiral spring 13c with spring legs 14c, which are again arranged between an annular outer holder 15c and a center holder 16c. The spring legs 14c are symmetrically shaped only around the actuator axis A, too, but are shaped like a meander and thus can be made very long and very soft within a small radial room. It is a more extreme version of a spiral spring 13c with spring legs 14c which do not have a curvature which continuously changes in a single direction when viewed in a direction parallel to the coil axis A. In fact, there is not just a maximum of the curvature, but the curvature changes its direction in this embodiment. However, because the inner end point P1 and the outer end point P2 of a spring leg 14c are located at different angular positions or on different radial rays r1, r2, the spring leg 14c mainly or globally runs "spirally". Here, the first radial ray r1 goes through the inner end point P1, and the second radial ray r2 goes through the outer end point P2. So, the spring legs 14c mainly run in a clockwise direction from their inner end points P1 to their outer end points P2.

Figure 10:
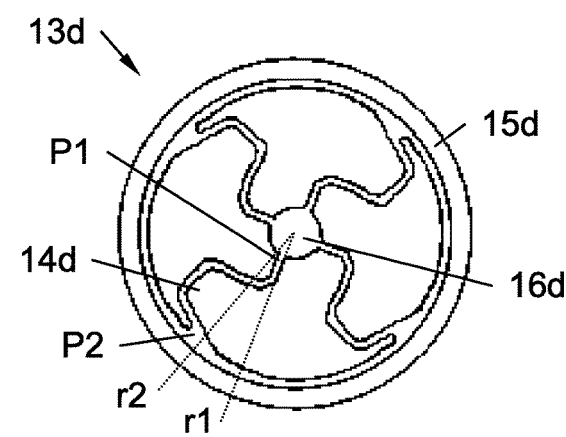
FIG. 10 shows a top view of a spiral spring with spring legs having corners.

FIG. 10 shows an alternative embodiment of a spiral spring 13d, which is similar to the spiral springs 13b and 13c shown in FIGS. 8 and 9. In contrast, the maximum of the curvature of the spring legs 14d of the spiral spring 13d more or less forms corners. Again the curvature of the spring legs 14d changes its direction in this embodiment, but again the spring legs 14d mainly run in a clockwise direction from their inner end points P1 to their outer end points P2 as is made visible by the radial rays r1, r2.

In the example shown in FIGS. 1 to 4, there are two separate spiral springs 13a' ... 13a''' arranged at an axial distance, wherein of course, the spiral springs 13b ... 13d may be used instead of the spiral springs 13a' ... 13a'''. Although this is advantageous, this is not the only possibility. It is also imaginable that the spring arrangement 12e comprises two spiral springs 13e', 13e", which are wound in opposite directions and which are nested radially like this is the case for the spring arrangement 12e shown in FIG. 11 which is used for the electromagnetic actuator 1d shown in FIG. 5 and used for the electromagnetic actuator 1e shown in FIG. 6.

In other words, a second (inner) spiral spring 13e" is arranged within a first (outer) spiral spring 13e' in radial direction when viewed in a direction parallel to the coil axis A. In this way, the spiral springs 13e', 13e" are connected and switched in series what makes the spring arrangement 12e very flat. That means that little space is needed for the spring arrangement 12e in the excursion direction C of the electrodynamic transducer 1d. Beneficially, this embodiment of the spring arrangement 12e allows for very flat electrodynamic transducers 1d what is favorable if the electrodynamic transducer 1d is built in a portable handheld device.

In this embodiment, the two spiral springs 13e', 13e" are concentric. Moreover, a connecting ring 22 is arranged between said two spiral springs 13e', 13e" and connects the same. This connecting ring 22 substantially stabilizes the spring arrangement 12e and in particular avoids an excessive rocking movement. The connecting ring 22 can be arranged in the middle of the radial extension of the spring arrangement 12e. However, it can also be located in the outer half so as to provide more space for the inner spiral spring 13e". In an advantageous embodiment, the area seized by the inner spiral spring 13e" substantially equals the area seized by the outer spiral spring 13e' when viewed in a direction parallel to the coil axis A. "Substantially equal" in this context in particular means a deviation by less than 10%.

Figure 11:
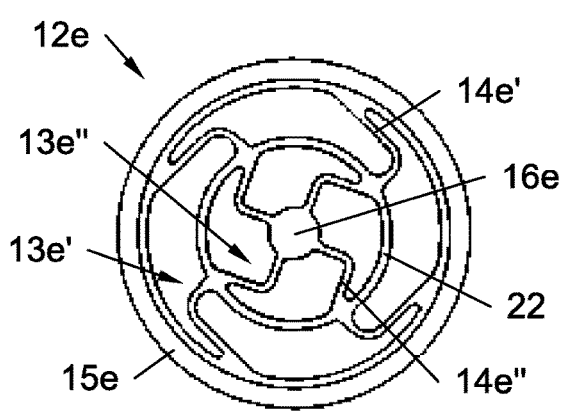

In fact, the spring arrangement 12e of FIG. 11 is similar to the spiral spring 13d depicted in FIG. 10 except of the connecting ring 22. Because spring legs 14d of the spiral spring 13d of FIG. 10 change their direction from a clockwise winding direction to a counterclockwise winding direction between the inner end point P1 and the outer end point P2, the spiral spring 13d of FIG. 10 can be seen as a spring arrangement with two spiral springs, which are wound in opposite directions and which are nested radially (but without a connecting ring 22). The very same counts for the spiral spring 13c of FIG. 9 which can be seen as spring arrangement with two spiral springs, which are wound in opposite directions and which are nested radially as well.

In the above context it should also be noted that the inner end point of the inner spiral spring 13e" and the outer end point of the outer spiral spring 13e' are located at substantially the same angular position, whereas the inner end point and the outer end point of the inner spiral spring 13e" are located at different angular positions, and whereas the inner end point and the outer end point of the outer spiral spring 13e' are located at different angular positions. Accordingly, the inner spiral spring 13e" is wound in clockwise direction, and the outer spiral spring 13e' is wound in counterclockwise direction. This is however no necessary condition, and the inner end point of the inner spiral spring 13e" and the outer end point of the outer spiral spring 13e' can be located at different angular positions. In addition, the winding directions of the inner spiral spring 13e" and the outer spiral spring 13e' may change as well.

Figure 12:
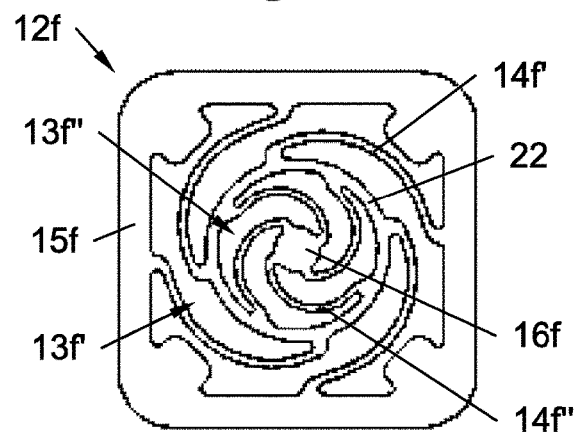
FIG. 12 shows a top view of a spring arrangement with a rectangular annular outer holder.

FIG. 12 finally shows an embodiment of a spring arrangement 12f, which involves characteristics of the spring arrangement 12e of FIG. 11 and the spiral spring 13a depicted in FIG. 7. In detail, again there are two spiral springs 13f', 13f" which are wound in opposite directions, which are nested radially, which are concentric and which are connected by a connecting ring 22. In contrast to the spring arrangement 12e of FIG. 11, the spring legs 14f', 14f"

of the spring arrangement 12f are spirally and arc shaped. The spring legs 14f', 14f'' have a curvature, which continuously changes in a single direction when viewed in a direction parallel to the coil axis A. Do also note that the outer end point of the inner spiral spring 13f'' and the inner end point of the outer spiral spring 13f' are located at different angular positions, but they can also be located at the same angular position.

The design of the spring arrangements 12a, 12e is not the only difference between the electromagnetic actuator 1a and the electromagnetic actuator 1d. Another difference is that the electromagnetic actuator 1d is built without a center connector 17a. Instead, the magnet system 6d, which is movable as a whole in this case and which comprises a top plate 7d, a bottom plate 8d and a center magnet 9d, is directly connected to the spring arrangement 12e. In detail, the annular outer holder 15e is connected to the plate like structure 2 by means of the adhesive sheet 20 or the glue layer, and the center holder 16e is connected to the top plate 7d. Again, the electromagnetic actuator 1d together with the plate like structure 2 forms an output device 21d for audio data, in case that the plate like structure 2 is embodied as a display for both audio and video data.

Figure 6:
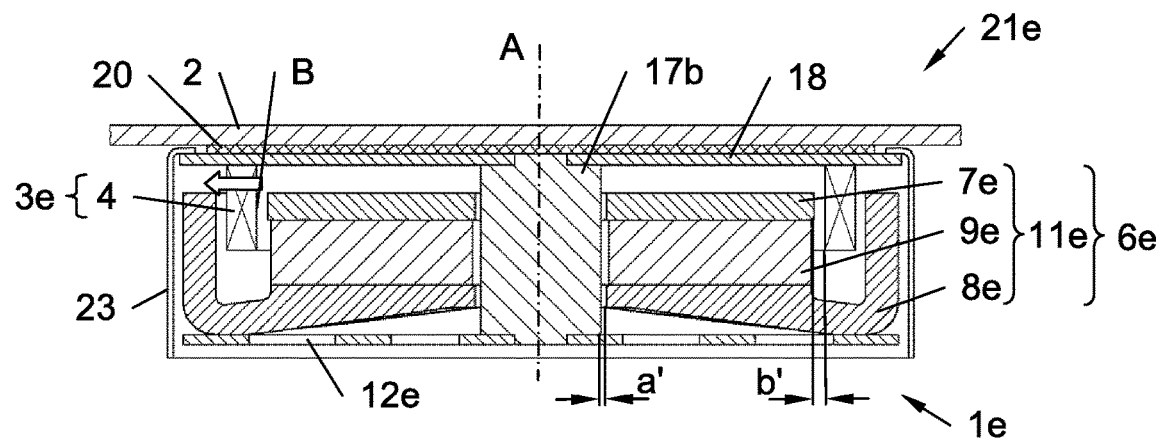
FIG. 6 shows a fifth embodiment of an electromagnetic actuator with two nested spiral springs in sectional view.

FIG. 6 shows a further example of an electromagnetic actuator 1e, which has a coil arrangement 3e with a single coil 4. The movable part 11e of the magnet system 6e again comprises a top plate 7e from soft iron, a bottom plate 8e from soft iron and a center magnet 9e mounted to the top plate 7e and to the bottom plate 8e. The top plate 7e is disc shaped and the bottom plate 8e is pot shaped, wherein the annular part of the pot shaped bottom plate 8e is arranged outside of the annular coil arrangement 3e. Again, a center connector 17e is fixedly arranged relative to the plate like structure 2. A center holder 16e of a spring arrangement 12e is mounted to the center connector 17e and the bottom plate 8e of the movable part 11c of the magnet system 6c is mounted to an annular outer holder 15e of the spring arrangement 12e. Beneficially, the connecting area between the bottom plate 8e and the annular outer holder 15e is comparably large in this embodiment because the annular outer holder 15e extends beyond the coil arrangement 3e.

Finally, the electromagnetic actuator 1e comprises a ring cover 23 protecting the inner parts of the electromagnetic actuator 1e. Again, an air gap a' between the movable part 11e of the magnet system 6e and the center connector 17e is smaller than an air gap b' between the movable part 11e of the magnet system 6e and the annular coil arrangement 3e, wherein the gaps a' and b' are each measured in a direction perpendicular to the actuator axis A. The advantages disclosed in the context of the electromagnetic actuator 1a apply equally, i.e. the movable part 11e of the magnet system 6e usually cannot collide with the coil arrangement 3e.

Again, the electromagnetic actuator 1e together with the plate like structure 2 forms an output device 21e for audio data, in case that the plate like structure 2 is embodied as a display for both audio and video data.

Figure 5:
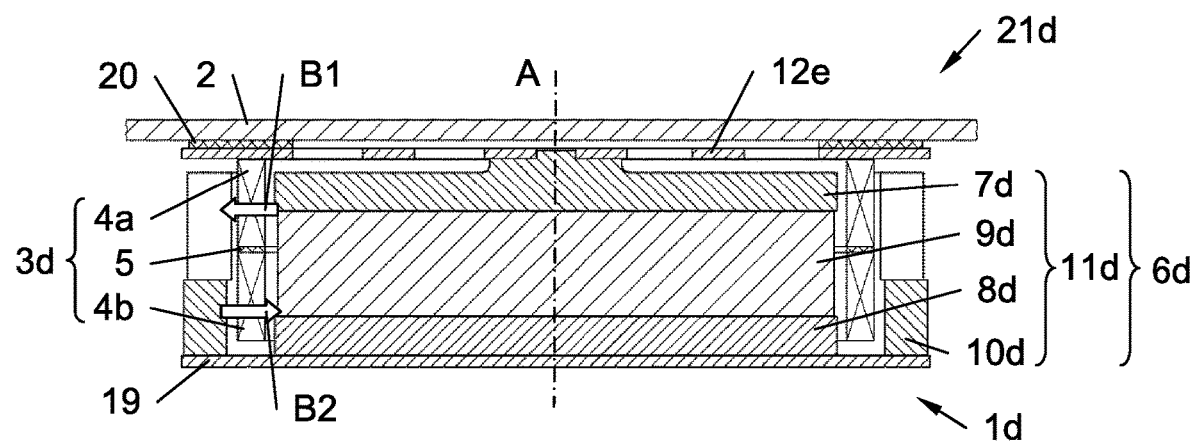
FIG. 5 shows a fourth embodiment of an electromagnetic actuator with two nested spiral springs in sectional view.

FIGS. 5 and 6 also show that the two spiral springs 13e', 13e'' of the spring arrangement 12e are arranged in the same plane perpendicular to the coil axis A in their spring idle positions. Again, the spring idle position is the position of spiral springs 13e', 13e'', in which outer end points P2 and inner end points P1 of all spring legs 14a of the spiral springs 13e', 13e'' are all arranged in a plane perpendicular to the coil axis A.

It should be noted that the spring arrangements 12e and 12f depicted in FIGS. 11 and 12 are not limited to the electromagnetic actuators 1d, 1e of FIGS. 5 and 6, but may be used for the designs shown in FIGS. 1 to 4 as well. If so, a spring arrangement 12a comprises more than two spiral springs 13a' ... 13a''''.

Generally, it is of advantage, if a sum of rotation angles of the at least two spiral springs 13a' ... 13f'' of a spring arrangement 12a ... 12f is less than 5° over the full nominal excursion range of the electrodynamic transducer 1a ... 1e. In this way, the coil arrangement 3a ... 3e is not rotated much against the movable part 11a ... 11e of the magnet system 6a ... 6e around the coil axis A when there is a relative movement between the coil arrangement 3a ... 3e and the movable part 11a ... 11e of the magnet system 6a ... 6e in excursion direction C.

The spiral springs 13a' ... 13f'' beneficially can be made of metal, made of plastics or made of a combination thereof. These are materials which allow for a high number of excursions and thus for a long lifetime of the electrodynamic transducer 1a ... 1e. A combination of metal and plastics in particular means a metal spring 13a' ... 13f'' which is coated with plastics.

In the embodiments presented hereinbefore, the spring arrangements 12a ... 12f comprise exactly two spiral springs 13a' ... 13f'' each. In this way, a minimum number of spiral springs 13a' ... 13f'' is used to avoid a substantial rotation between the coil arrangement 3a ... 3e and the movable part 11a ... 11e of the magnet system 6a ... 6e. However, in principle there also could be more than two spiral springs 13a' ... 13f''' per spring arrangement 12a ... 12f.

In the examples presented hereinbefore, all spring legs 14a ... 14d of the spiral springs 13a' ... 13d of a spring arrangement 12a ... 12d are of identical shape. Hence, also the length of all spring legs 14a ... 14d of a spring arrangement 12a ... 12d is the same. In this way, uniform characteristics of the spiral springs 13a' ... 13d are obtained. Nonetheless, the spring legs 14a ... 14d may also have different shapes, and in particular the lengths of the spring legs 14a ... 14d of a spring arrangement 12a ... 12d may be different. In this way, uniform characteristics of the spiral springs 13a' ... 13d can be obtained for different spring geometries. For example, the inner spiral spring 13e'', 13f'' of two nested spiral springs 13e' ... 13f'' can have shorter spring legs 14e'', 14f'' than the outer spiral spring 13e', 13f'. In this way, different available space for the inner and the outer spiral spring 13e' ... 13f'' is considered. In this context it is advantageous if a connecting ring 22 connecting the at least two spiral springs 13e' ... 13f'' is located in the outer half so as to provide more space for the inner spiral spring 13e'', 13f'''. It may also be beneficial, if the spring legs 14e'', 14f'' of the inner spring 13e'', 13f'' are made narrower and/or thinner than the spring legs 14e', 14f' of the outer spring 13e', 13f', wherein the width of a spring leg 14e' ... 14f'' is the extension of its cross section in a plane parallel to the coil axis A and wherein the thickness of a spring leg 14e' ... 14f''' is its extension in a direction parallel to the coil axis A.

Generally it is of advantage if the length of a spring leg 14a ... 14f''' is at least 30% of a circumference of a circle running through the inner starting point P1 of the spring leg 14a ... 14f'''. In this way, the spiral spring 13a ... 13f''' allows for a substantial relative movement between the coil arrangement 3a ... 3e and the movable part 11a ... 11e of the magnet system 6a ... 6e (i.e. a substantial excursion of the electrodynamic transducer 1a ... 1e) and hence for a comparably high output power, too.

Moreover, in the examples presented hereinbefore, the spiral springs 13a' ... 13f''' of a spring arrangement 12a ... 12f each have the same number of spring legs 14a . . . 14f". In this way, uniform characteristics of the spiral springs 13a . . . 13f" are obtained as well. Nevertheless, the spiral springs 13a . . . 13f" of a spring arrangement 12a . . . 12f may have different numbers of spring legs 14a . . . 14f". In this way, uniform characteristics of the spiral springs 13a . . . 13f" can be obtained for different spring geometries. For example, the inner spiral spring 13e''', 13f''' of two nested spiral springs 13e' . . . 13f''' can have less spring legs 14e''', 14f''' than the outer spiral spring 13e', 13f'. In this way, empty spaces between the spring legs 14e' . . . 14f''' of comparable size can be provided for both the inner and the outer spiral spring 13e' . . . 13f''' what is beneficial if the spring arrangement 12a . . . 12f is made by punching.

In a further advantageous embodiment of an electrodynamic transducer 1a . . . 1e, the spiral springs 13a . . . 13f" of a spring arrangement 12a . . . 12f have the same thickness. In other words, at least two spiral springs 13a . . . 13f" have the same extension in a direction parallel to the coil axis A. In particular if the at least two spiral springs 13e' . . . 13f''' are nested radially, a plate like basic material can be used for manufacturing the spring arrangement 12e, 12f.

Advantageously, a width of a spring leg 14a . . . 14f" (which is the extension of a spring legs 14a . . . 14f" cross section in a plane parallel to the coil axis A) is 2 to 10 times a thickness of the spring leg 14a . . . 14f" (which is the extension of a spring leg 14a . . . 14f" in a direction parallel to the coil axis A). In this way, the spring 13a . . . 13f" can be made comparably soft in the excursion direction C which allows for high output power, whereas undesired lateral movement is substantially hindered.

Beneficially, an average sound pressure level of the output device 21a . . . 21e measured in an orthogonal distance of 10 cm from the sound emanating surface S is at least 50 dB in a frequency range from 100 Hz to 15 kHz. Alternatively or in addition, an average ratio between a sound pressure level of the output device 21a . . . 21e measured in an orthogonal distance of 10 cm from the sound emanating surface S and an electrical power feed into the electromagnetic transducer 1a . . . 1e is at least 400 dB/W in a frequency range from 100 Hz to 15 kHz. In the embodiments shown in the Figures, the point of measurement is 10 cm above the upper surface of the plate like structure 2.

It should be noted that in the designs shown in FIGS. 1 to 4 the inner endpoints P1 of the first spiral spring 13a' can be turned against the inner endpoints P1 of the second spiral spring 13a'', 13a''' around the coil axis A, and the outer endpoints P2 of the first spiral spring 13a' can be turned against the outer endpoints P2 of the second spiral spring 13a'', 13a''' around the coil axis A. In this way, a tilting movement of the movable part 11a . . . 11c of the magnet system 6a . . . 6c in relation to the coil arrangement 3a . . . 3c can be avoided or at least can be kept low.

It should also be noted that neither the annular outer holder 15a . . . 15e, nor the center holder 16a . . . 16f is a mandatory part of a spring arrangement 12a . . . 12e. In contrast, the annular outer holder 15a . . . 15e and/or the center holder 16a . . . 16f can be omitted. The spring legs 14a . . . 15f''' are held in position then by their fixation on a spring mounted part (e.g. on the top plate 7a . . . 7e, the bottom plate 8a . . . 8e, the center connector 17a, 17b, etc.).

Generally, do note that different spiral springs 13a . . . 13f''' of a spring arrangement 12a . . . 12f do not have to contribute to an axial force in the same way. Instead, the focus is put on the cancellation or at least reduction of a total rotational movement.

It should also be noted that although it is advantageous if the annular coil arrangement 3a . . . 3e is fixedly arranged relative to the plate like structure 2 and the magnet system 6a . . . 6e partly or as a whole is movably arranged relative to the plate like structure 2, it is also imaginable that the magnet system 6a . . . 6e is fixedly arranged relative to the plate like structure 2 and the coil arrangement 3a . . . 3e is movably arranged relative to the plate like structure 2.

Furthermore, it should be noted that the examples depicted in the FIGS. are not limited to a particular circular or polygonal shape of the electromagnetic actuators 1a . . . 1e and their parts. Instead, the shape of the electromagnetic actuators 1a . . . 1e in top view is interchangeable. In particular, the voice coil 4, 4a, 4b can have a circular shape, a polygonal shape (in particular rectangular) or an oval shape when viewed in a direction parallel to the coil axis A.

The proposed measures offer a number of advantages. First of all, the efficiency of the electromagnetic actuator 1a . . . 1e is very good, because a rotation between the coil arrangement 3a . . . 3e (its voice coils 4, 4a, 4b) and the movable part 11a . . . 11e of the magnet system 6a . . . 6e, which just draws energy and does not contribute to the output of sound at all, is avoided or at least reduced. Second, the frequency response of the electromagnetic actuator 1a . . . 1e is not or less spoiled by a rotation between the coil arrangement 3a . . . 3e and the movable part 11a . . . 11e of the magnet system 6a . . . 6e. Furthermore, the proposed measures allow for electromagnetic actuators 1a . . . 1e with a low tendency to a rocking movement between the coil arrangement 3a . . . 3e and the movable part 11a . . . 11e of the magnet system 6a . . . 6e. Finally, the proposed measures are very favorable in case of non-circular voice coils 4, 4a, 4b. Because a rotation between the voice coil 4, 4a, 4b and the movable part 11a . . . 11e of the magnet system 6a . . . 6e is avoided or at least reduced, the air gap b . . . b" between the voice coil 4, 4a, 4b and said movable part 11a . . . 11e system can be made very small without risking a collision between the voice coil 4, 4a, 4b and the movable part 11a . . . 11e. In turn, the efficiency of the electrodynamic transducer 1a . . . 1e can be enhanced further.

It should also be noted that the invention is not limited to the above-mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES

1a . . . 1e electromagnetic actuator
2 plate like structure (e.g. display)
3a . . . 3e annular coil arrangement
4, 4a, 4b voice coil
5 glue layer
6a . . . 6e magnet system
7a . . . 7e top plate
8a . . . 8e bottom plate
9a . . . 9e center magnet
10a . . . 10e outer ring (fixed part of the magnet system)

11a ... 11e movable part of the magnet system
12a ... 12f spring arrangement
13a ... 13f" spiral spring
14a ... 14f" spring legs
15a ... 15f annular outer holder
16a ... 16f center holder
17a, 17b center connector
18 top mounting plate
19 bottom mounting plate
20 adhesive sheet/glue layer
21a ... 21e output device
22 connecting ring
23 ring cover
a, a' air gap between the movable part of the magnet system and the center connector
a" air gap between the movable part of the magnet system and the outer ring
b ... b" air gap between the movable part of the magnet system and the annular coil arrangement
A coil axis (actuator axis)
B, B1, B2 magnetic field
C excursion direction
r1, r2 radial ray
S (main) sound emanating surface
P1 inner end point of spring leg
P2 outer end point of spring leg

What is claimed is:

1. An electromagnetic actuator, configured to be connected to a backside of a plate like structure opposite to a sound emanating surface of the plate like structure, the electromagnetic actuator comprising:
at least one voice coil, the voice coil having an electrical conductor in the shape of loops running around a coil axis in a loop section;
a magnet system configured to generate a magnetic field transverse to the electrical conductor in the loop section, the magnet system being comprised of an outer ring disposed around the at least one voice coil, a center magnet disposed within the at least one voice coil, a top plate disposed on top of the center magnet, and a bottom plate disposed on the bottom of the center magnet opposite the top plate, the center magnet, top plate, and bottom plate forming a movable part of the magnet system and being movable relative to the outer ring and to the at least one voice coil; and
a spring arrangement comprising at least two spiral springs, wherein a first spiral spring is attached to the outer ring and the top plate, and the second spiral spring is attached to the outer ring and the bottom plate, the at least two spiral springs configured to allow a relative movement between the voice coil and said movable part of the magnet system in an excursion direction parallel to the coil axis, each of the at least two spiral springs comprising at least three spring legs,
wherein the spring legs of a spiral spring of the at least two spiral springs run in radial and tangential direction and have an inner end point and an outer end point each and are rotational symmetric around the coil axis,
wherein the inner end point and the outer end point of each spiral spring define a clockwise winding direction for a spiral spring if its spring legs mainly run in a clockwise direction from their inner end points to their outer end points and define a counterclockwise winding direction for a spiral spring if its spring legs mainly run in a counterclockwise direction from their inner end points to their outer end points, and
wherein the winding directions of the at least two spiral springs are chosen in a way that rotations around the coil axis caused by a relative movement between the voice coil and the movable part of the magnet system in the excursion direction are oriented in opposite directions.

2. The electromagnetic actuator according to claim 1, wherein the at least two spiral springs are wound in the same direction and excursed in opposite directions with respect to their spring idle position in an actuator idle position of the magnet system/the voice coil, wherein:
the spring idle position is a position of a spiral spring, in which the inner end points and the outer end points of all spring legs of the spiral spring are all arranged in a plane perpendicular to the coil axis, and
the actuator idle position indicates the relative position between the voice coil and the movable part of the magnet system when no current flows through the at least one voice coil.

3. The electromagnetic actuator according to claim 1, wherein the at least two spiral springs are wound in opposite directions and either:
a) are in their spring idle position in the actuator idle position of the magnet system/the voice coil; or
b) are excursed in the same direction in relation to their spring idle position in the actuator idle position of the magnet system/the voice coil;
wherein in cases a) and b), the spring idle position is a position of a spiral spring, in which the inner end points and the outer end points of all spring legs of the spiral spring are all arranged in a plane perpendicular to the coil axis, and
wherein the actuator idle position indicates the relative position between the voice coil and the magnet system when no current flows through the at least one voice coil.

4. The electromagnetic actuator according to claim 1, wherein a sum of rotation angles of the at least two spiral springs is less than 5° over the full nominal excursion range of the electromagnetic actuator.

5. Electromagnetic actuator according to claim 1, wherein said two spiral springs are made of metal, made of plastics, or made of a combination thereof.

6. The electromagnetic actuator according to claim 1, wherein the spring arrangement comprises exactly two spiral springs.

7. The electromagnetic actuator according to claim 1, wherein the at least two spiral springs have the same thickness.

8. The electromagnetic actuator according to claim 1, wherein a spring leg has a curvature which continuously changes in a single direction when viewed in a direction parallel to the coil axis.

9. The electromagnetic actuator according to claim 1, wherein a spring leg comprises a corner when viewed in a direction parallel to the coil axis.

10. The electromagnetic actuator according to claim 1, wherein a spring leg is shaped like a meander when viewed in a direction parallel to the coil axis.

11. The electromagnetic actuator according to claim 1, wherein the length of a spring leg is at least 30% of a circumference of a circle running through the inner starting point of the spring leg.

12. The electromagnetic actuator according to claim 1, wherein the length of all spring legs of a spring arrangement is the same.

13. The electromagnetic actuator according to claim 1, wherein the lengths of the spring legs of a spring arrangement is different.

14. The electromagnetic actuator according to claim 1, wherein the voice coil has a circular shape, a polygonal shape or an oval shape when viewed in a direction parallel to the coil axis.

15. The electromagnetic actuator according to claim 1, wherein all spring legs of the at least two spiral springs are of identical shape.

16. The electromagnetic actuator according to claim 1, wherein the at least two spiral springs each have the same number of spring legs.

17. The electromagnetic actuator according to claim 1, wherein a width of a spring leg is 2 to 10 times a thickness of the spring leg.

18. The electromagnetic actuator according to claim 1, wherein the at least one voice coil or the magnet system comprises a flat mounting surface, the flat mounting surface configured to be connected to the backside of the plate like structure opposite to a sound emanating surface of the plate like structure, wherein said backside is oriented perpendicularly to the coil axis.

19. An output device, comprising a plate like structure with a sound emanating surface and a backside opposite to the sound emanating surface and comprising an electromagnetic actuator connected to said backside, wherein the electromagnetic actuator is designed according to claim 1.

20. The output device as claimed in claim 19 characterized in that the plate like structure is embodied as a display and that the electromagnetic actuator is connected to the backside of the display.

21. The output device as claimed in claim 19, characterized in that an average sound pressure level of the output device measured in an orthogonal distance of 10 cm from the sound emanating surface is at least 50 dB_SPL in a frequency range from 100 Hz to 15 kHz.

22. An electromagnetic actuator, configured to be connected to a backside of a plate like structure opposite to a sound emanating surface of the plate like structure, the electromagnetic actuator comprising:
    at least one voice coil, the voice coil having an electrical conductor in the shape of loops running around a coil axis in a loop section;
    a magnet system configured to generate a magnetic field transverse to the electrical conductor in the loop section; and
    a spring arrangement connecting the at least one voice coil and a movable part of the magnet system configured to allow a relative movement between the voice coil and said movable part of the magnet system in an excursion direction parallel to the coil axis, the spring arrangement comprising at least two spiral springs, each of the at least two spiral springs comprising at least three spring legs,
    wherein the spring legs of a spiral spring of the at least two spiral springs run in radial and tangential direction and have an inner end point and an outer end point each and are rotational symmetric around the coil axis,
    wherein the inner end point and the outer end point of each spiral spring define a clockwise winding direction for a spiral spring if its spring legs mainly run in a clockwise direction from their inner end points to their outer end points and define a counterclockwise winding direction for a spiral spring if its spring legs mainly run in a counterclockwise direction from their inner end points to their outer end points,
    wherein the winding directions of the at least two spiral springs are chosen in a way that rotations around the coil axis caused by a relative movement between the voice coil and the movable part of the magnet system in the excursion direction are oriented in opposite directions, and
    wherein the spring arrangement comprises at least two spiral springs, which are wound in opposite directions and are nested radially.

23. The electromagnetic actuator according to claim 22, wherein a connecting ring is arranged between said at least two spiral springs and connects the same.

24. The electromagnetic actuator according to claim 22, wherein the at least two spiral springs are concentric.

25. The electromagnetic actuator according to claim 22, wherein the at least two spiral springs are arranged in the same plane perpendicular to the coil axis in their spring idle positions, wherein the spring idle position is a position of a spiral spring, in which outer end points and inner end points of all spring legs of the spiral spring are all arranged in a plane perpendicular to the coil axis.

26. An electromagnetic actuator, configured to be connected to a backside of a plate like structure opposite to a sound emanating surface of the plate like structure, the electromagnetic actuator comprising:
    at least one voice coil, the voice coil having an electrical conductor in the shape of loops running around a coil axis in a loop section;
    a magnet system configured to generate a magnetic field transverse to the electrical conductor in the loop section; and
    a spring arrangement connecting the at least one voice coil and a movable part of the magnet system configured to allow a relative movement between the voice coil and said movable part of the magnet system in an excursion direction parallel to the coil axis, the spring arrangement comprising at least two spiral springs, each of the at least two spiral springs comprising at least three spring legs,
    wherein the spring legs of a spiral spring of the at least two spiral springs run in radial and tangential direction and have an inner end point and an outer end point each and are rotational symmetric around the coil axis,
    wherein the inner end point and the outer end point of each spiral spring define a clockwise winding direction for a spiral spring if its spring legs mainly run in a clockwise direction from their inner end points to their outer end points and define a counterclockwise winding direction for a spiral spring if its spring legs mainly run in a counterclockwise direction from their inner end points to their outer end points,
    wherein the winding directions of the at least two spiral springs are chosen in a way that rotations around the coil axis caused by a relative movement between the voice coil and the movable part of the magnet system in the excursion direction are oriented in opposite directions, and
    wherein the at least two spiral springs have different numbers of spring legs.

* * * * *